(12) United States Patent
Campo et al.

(10) Patent No.: US 7,147,780 B2
(45) Date of Patent: Dec. 12, 2006

(54) PROCESS FOR REDUCING SLUDGE DERIVED FROM THE TREATMENT OF WASTEWATER BY OXYGENATION AND MECHANICAL ACTION

(75) Inventors: Philippe Campo, Montigny le Bretonneux (FR); Jérôme Cluzeau, Versailles (FR)

(73) Assignee: L'Air Liquide, Société Anonyme à Directoire et Conseil de Surveillance pour l'Étude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 11/016,477

(22) Filed: Dec. 17, 2004

(65) Prior Publication Data

US 2005/0133445 A1    Jun. 23, 2005

(30) Foreign Application Priority Data

Dec. 17, 2003   (FR) .................................. 03 51087

(51) Int. Cl.
*C02F 3/00*   (2006.01)

(52) U.S. Cl. ...................... 210/613; 210/621; 210/631; 210/764

(58) Field of Classification Search ................ 210/613, 210/621–628, 631, 764
See application file for complete search history.

(56) References Cited

U.S. PATENT DOCUMENTS

| 3,380,499 A | * | 4/1968 | Vocci et al. ............ 241/199.12 |
| 4,269,714 A | | 5/1981 | Ishikawa et al. |
| 6,337,020 B1 | | 1/2002 | Thieblin et al. |
| 2004/0241074 A1 | * | 12/2004 | Yasunaga et al. ........... 423/322 |

FOREIGN PATENT DOCUMENTS

WO    WO 95 13990    5/1995

OTHER PUBLICATIONS

French Search Report for PCT/FR03/51087.

\* cited by examiner

*Primary Examiner*—Chester T. Barry
(74) *Attorney, Agent, or Firm*—Christopher J. Cronin

(57) ABSTRACT

A method for reducing the production of sludge derived from the treatment of wastewater. The sludge is subjected to a mechanical action in the presence of a gas containing oxygen. The mechanical action is performed in such a way as to destroy the cell walls of between 5% and 80% of the microorganisms present in the sludge.

15 Claims, No Drawings

PROCESS FOR REDUCING SLUDGE DERIVED FROM THE TREATMENT OF WASTEWATER BY OXYGENATION AND MECHANICAL ACTION

BACKGROUND

The present invention relates to a process for reducing the sludge derived from a wastewater treatment unit.

Aerobic biological treatments of effluents generally consist in bringing these effluents into contact with a biomass (microorganisms) which degrades the pollution contained in said effluents by converting the organic molecules to inorganic molecules: this is the step commonly called aeration of the biological tanks. The use of such treatments results in a gradual increase in the amount of biomass and in the need to evacuate the excess biomass, commonly called "excess sludge". Various solutions have been proposed in order to deal with the constantly increasing amount of this excess biological sludge and the evacuation thereof.

A first family of processes consists in removing this excess sludge at the end of the biological treatment and either finding it a suitable outlet or treating it in a specific degradation step. It can thus be used as fertilizer in agriculture (manuring). However, the adhering to environmental standards and the possible presence of micropollutants or of heavy metals in the sludge result in this use being decreased. Another solution consists in removing this sludge and incinerating it; it is then necessary to transport it to an incinerator, which involves some expense. In addition, the difficulties in installing new incinerators is hindering the development of this solution. Another solution consists in performing wet oxidation of the excess sludge: the sludge is then mineralized.

A second family of processes consists in reducing the production of sludge during the biological treatment. These solutions consist in using means for reducing the production of sludge during the biological process for depolluting water. These solutions consist in carrying out a partial lysis of the sludge, i.e. destroying some of the microorganisms which make up the sludge by making them partially soluble. The products derived from this lysis, which contain at least partially soluble organic compounds, can then be sent to the head of the effluent treatment in order to undergo the biological treatment, during which the microorganisms will treat the products derived from the lysis. A first known lysis technique consists in exercising a mechanical action on the sludge originating from the biological treatment tank, which causes some of the cells of the microorganisms constituting the excess sludge to rupture. This may be mechanical grinding, a compression/release technique, sonochemistry, etc. This technique is generally simple to carry out but has the disadvantage of only slightly reducing the excess sludge production. A second lysis technique is a basic or acid attack using chemical agents, optionally coupled with an increase in temperature, but this technique requires the pH of the solution obtained to be readjusted before it is reinjected into the aeration tank. The disadvantage of this solution is that it increases the salinity of the hydrolysed sludge, which can result in a dysfunction of the biological treatment step. A third lysis technique is based on the action of oxidizing agents such as: ozone, air, bleach, hydrogen peroxide or oxygen under pressure. The disadvantage of air, of hydrogen peroxide and of oxygen is that they are not effective enough alone: they must be combined with heating and/or a catalyst, which also increases the cost of these techniques. Document U.S. Pat. No. 4,269,714 describes a biological treatment process using micronization of the effluents and oxidation, providing both treatment of the sludge in a shorter amount of time and a reduction in the sludge produced. The micronization must be carried out in such a way as to avoid destruction of the microorganism cell walls, the only aim of the micronization being to increase the active surface of the flocs by separating the various constituents thereof.

The aim of the present invention is to provide a novel process for reducing the production of sludge derived from the treatment of wastewater.

SUMMARY

With this aim, the invention relates to a process for reducing the production of sludge derived from the treatment of wastewater, in which the sludge is subjected to a mechanical action in the presence of a gas comprising oxygen, the mechanical action being carried out in such a way that it destroys cell walls of 5 to 80% by weight, preferably 10 to 30% by weight, of the microorganisms present in the sludge. The invention therefore consists of a combination of two means of treatment: one being a mechanical treatment of the sludge in order to perform a partial lysis thereof, and the other being the bringing into contact of the effluents and of the partially mechanically destroyed sludge with a gas comprising oxygen in order to increase the kinetics of assimilation of the pollution present and generated. An essential condition for obtaining the reduction of sludge is to destroy the cell walls of only some of the microorganisms, complete destruction or simple oxygenation of the microorganism flocs without destruction of the cell walls not making it possible to achieve the aim set by the present invention. The invention sets the rate of destruction that provides the best results in terms of sludge reduction.

DESCRIPTION OF PREFERRED EMBODIMENTS

The mechanical action can be chosen from the following treatments: grinding, sonochemistry, the linking together of a compression and of a release. The grinding may consist in crushing the microorganisms between two surfaces, for example between two disks that are only a very small distance apart. By virtue of the design of its revolving elements, a pump may partially or completely perform this mechanical action. Sonochemistry consists in applying microwaves to the microorganisms. The linking together of a compression, followed by release, of the sludge contained in a flow also makes it possible to create a mechanical action on the sludge.

More particularly, the mechanical action may be obtained by combining a pump and at least one device that generates a mechanical constraint. The device generating a mechanical action may be chosen from a venturi, a hydroejector, an obstacle to the flow such as a pinching of the pipe in which the effluent or the sludge circulates, or an obstacle that the flow of effluent or of sludge strikes. The pump also provides a mechanical constraint. According to an advantageous mode, the pump induces a pressure of at least 2 bar absolute.

The gas comprising oxygen generally has an oxygen content of at least 25% by volume, preferably of at least 80% by volume. According to the preferred mode, the gas comprising oxygen is pure oxygen. According to a particularly advantageous mode, the gas comprising oxygen has a pressure of at least 1 bar relative.

The process according to the invention can be carried out on a wastewater treatment unit comprising a line for separating the sludge produced towards a clarifier or a flotation device, and a line for recycling the sludge from the clarifier to the aeration tank of the wastewater treatment unit, the mechanical action in the presence of the gas comprising oxygen being carried out on the sludge in the recycling line.

The process can also be carried out in the aeration tank of a wastewater treatment unit.

The process can be carried out at a temperature of between 10 and 70° C., preferably of between 15 and 40° C.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used to reduce the amount of sludge produced by wastewater treatment unit, said method comprising the steps of:
    providing a wastewater treatment unit comprising:
        1) an aeration tank;
        2) an evacuating line connected to a treatment component, wherein said treatment component comprises at least one member selected from the group consisting of:
            i) a clarifier; and
            ii) a flotation device: and
        3) a recycling line connected to both said treatment component and said aeration tank; and
    subjecting sludge to a mechanical action in the presence of a gas comprising oxygen in either the recycling line or the aeration tank, wherein said mechanical action destroys the cell walls of about 5% to about 80%, by weight, of the microorganisms present in said sludge.

2. The method of claim 1, wherein said mechanical action destroys said cell walls of about 10% to about 30%, by weight, of said microorganisms in said sludge.

3. The method of claim of claim 1, wherein said mechanical action comprises at least one member selected from the group consisting of:
    a) grinding actions;
    b) sonochemistry actions; and
    c) compressing and releasing actions.

4. The method of claim 1, further comprising producing said mechanical action by combining a pump with at least one mechanical constraint generating means.

5. The method of claim 4, wherein said pump generates a pressure of at least about 2 bar absolute.

6. The method of claim 4, wherein said mechanical constraint generating means comprises at least one member selected from the group consisting of:
    a) a venturi;
    b) a hydroejector; and
    c) an obstacle to the flow of said sludge.

7. The method of claim 1, wherein said gas comprising oxygen has an oxygen content of at least about 25% by volume.

8. The method of claim 7, wherein said oxygen content is at least about 80% by volume.

9. The method of claim 1, wherein said gas comprising oxygen has an oxygen content of about 100% by volume.

10. The method of claim 1, where said gas comprising oxygen has a pressure of at least about 1 bar absolute.

11. The method of claim 1, wherein:
    said sludge is subjected to said mechanical action in the presence of said gas comprising oxygen in said recycling line.

12. The method of claim 1, wherein said subjecting of sludge is to mechanical action in the presence of a gas comprising oxygen is performed in the aeration tank.

13. The method of claim 1, wherein said method is performed at a temperature between about 10° C. and about 70° C.

14. A method which may be used to reduce the amount of sludge produced by wastewater treatment unit, said method comprising subjecting sludge to a mechanical action in the presence of a gas comprising oxygen, wherein:
    a) said mechanical action destroys the cell walls of about 10% to about 30%, by weight, of the microorganisms present in said sludge; and
    b) said gas comprising oxygen:
        1) has an oxygen content of at least about 80% by volume; and
        2) has a pressure of at least 1 bar absolute.

15. A method which may be used to reduce the amount of sludge produced by a wastewater treatment unit, said method comprising subjecting sludge to a mechanical action in the presence of a gas comprising oxygen, wherein:
    a) said mechanical action comprises at least one member selected from the group consisting of:
        1) grinding actions;
        2) sonochemistry actions; and
        3) compressing and releasing actions;
    b) said mechanical action is produced by combining a pump with at least one mechanical constraint generating means, wherein said mechanical constraint generating means comprises at least one member selected from the group consisting of:
        1) a venturi;
        2) a hydroejector; and
        3) an obstacle to the flow of said sludge;
    c) said pump generates a pressure of at least 2 bar absolute;
    d) a wastewater treatment unit comprises:
        1) an evacuating line connected to a treatment component, wherein said treatment component comprises at least one member selected from the group consisting of:
            i) a clarifier; and
            ii) a flotation device; and
        2) a recycling line connected to both said treatment component and the aeration tank of said wastewater treatment unit; and
    e) said sludge is subjected to said mechanical action in the presence of said gas comprising oxygen in said recycling line.

* * * * *